United States Patent

Kikuchi

[11] 4,060,158
[45] Nov. 29, 1977

[54] COOLING FAN CONTROL MECHANISM
[75] Inventor: Yasuhei Kikuchi, Shizuoka, Japan
[73] Assignee: Usui International Industry, Ltd., Japan
[21] Appl. No.: 653,255
[22] Filed: Jan. 28, 1976
[51] Int. Cl.² .................... F16D 35/00; F16D 43/25
[52] U.S. Cl. ................... 192/82 T; 192/58 B; 236/48 R
[58] Field of Search ............ 192/58 B, 82 T; 236/48 R, 101 E; 251/11, 75; 337/343, 347

[56] References Cited
U.S. PATENT DOCUMENTS

| | | | |
|---|---|---|---|
| 1,864,483 | 6/1932 | Cohn-byk et al. | 337/347 X |
| 2,262,027 | 11/1941 | Marcy | 337/347 |
| 2,331,408 | 10/1943 | Marcy | 337/343 X |
| 2,381,567 | 8/1945 | Bonham | 192/82 T |
| 2,570,515 | 10/1951 | Bonham | 192/82 T |
| 2,877,751 | 3/1959 | Johnston | 192/82 T |
| 3,573,700 | 4/1971 | Schmitt | 337/347 |

FOREIGN PATENT DOCUMENTS 47,214  12/1974  Japan .................. 192/82 T

Primary Examiner—Allan D. Herrmann
Attorney, Agent, or Firm—Burns, Doane, Swecker & Mathis

[57] ABSTRACT

A control mechanism having spring means and an instantaneously heat-responsive bimetal member used in a drive fluid coupling for cooler fan blades of an engine of vehicles.

6 Claims, 9 Drawing Figures

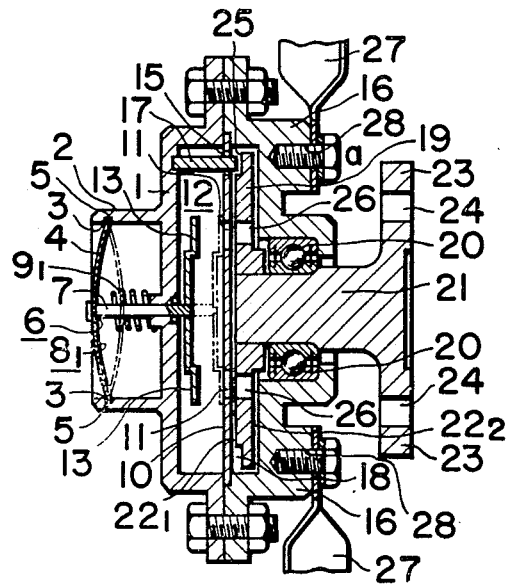
FIG. 1
FIG. 5
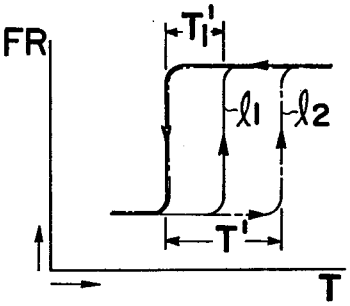
FIG. 2
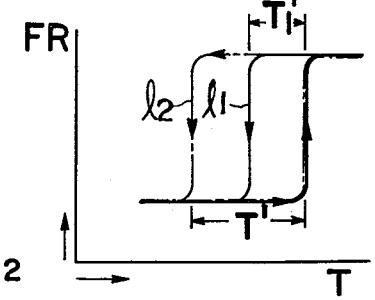
FIG. 6

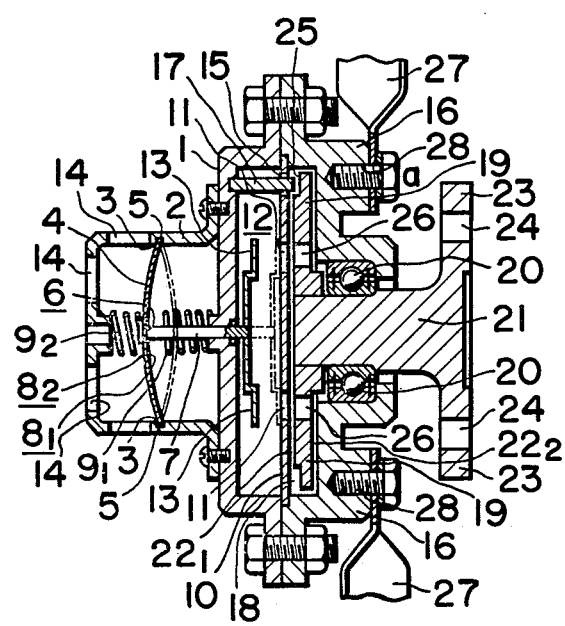
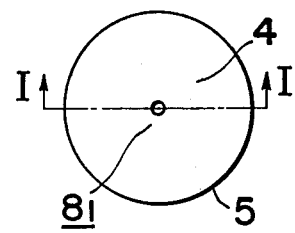
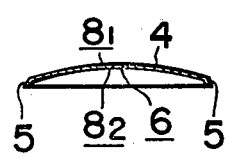
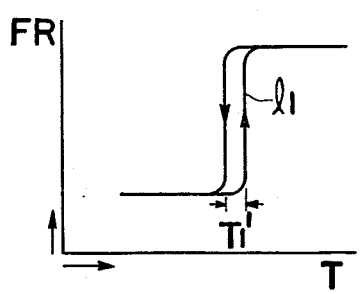
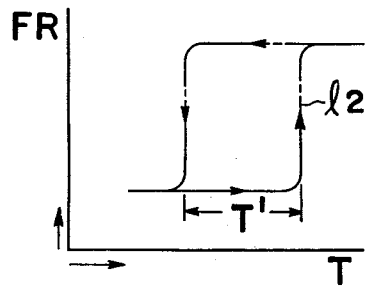

COOLING FAN CONTROL MECHANISM

BACKGROUND OF THE INVENTION

This invention relates to a control mechanism having spring means and an instantaneously heat-responsive bimetal member used in a drive fluid coupling for cooler fan blades of an engine of vehicles, such as automobiles or the like.

Japanese patent publication No. 47214/74 (filed as application No. 74442/67) discloses a drive fluid coupling for cooler fan blades of an engine of vehicles, such as automobiles or the like having an attachment base disposed on the front face of a casing closure is provided with a cup-shaped, snap spring-like heat-responsive bimetal member of an apex centering, deformable concavo-convex section attached in engagement of its peripheral edge in an annular groove formed in the attachment base, and with an actuating rod extending from the apex portion of the bimetal member thereby to actuate a fluid clutch at the distal end.

However, the conventional bimetal member 4 the type described above has the disadvantage that the temperatures at which deformation and restoration of the bimetal occur are widely different, therefore activation and deactivation of the fluid clutch occur at different temperatures.

ADVANTAGES OF EMBODIMENTS OF THE INVENTION

An object of this invention is, therefore, to provide a control mechanism of a bimetal member for a coupling of the class referred to herein for approximating to a determined degree operative temperatures in response to which it is inversely deformed and restored.

Another object of this invention is to provide a control mechanism of a bimetal member for a coupling of the class enabling the operative temperatures to be adjusted correspondingly to the characteristic of the bimetal.

Yet another object of the present invention is to provide a spring or springs coupled with the heat-responsive bimetal member thereby to preliminarily apply to the bimetal member an urging force tending to approximate operative temperatures to which the bimetal member is inversely deformed and restored in response.

A further object of the present invention is to provide a drive fluid coupling for cooler fan blades of an engine of vehicles, such as automobiles or the like comprises in combination an attachment base disposed on the front face of a casing closure, a cup-shaped, snap spring-like heat-responsive bimetal member of an apex centering, reversally deformable concavo-convex section attached by engagement of its peripheral edge in an annular groove formed in the attachment base an actuating rod extending from the apex portion of the bimetal member thereby to actuate a fluid clutch $a$ at the distal end, and a spring disposed on the inner, the external or both surfaces of bimetal member.

The other objects, features and advantages of this invention will be apparent in the following description made with reference to the drawings.

BRIEF DESCRIPTION OF THE DRAWINGS

FIG. 1 shows a longitudinal section of one embodiment of the invention;

FIG. 2 diagrammatically shows characteristics of one embodiment of the invention;

FIG. 3 shows a front view of the bimetal incorporated in embodiments of the invention;

FIG. 4 shows a cross section taken along line I—I of FIG. 3;

FIG. 5 shows a longitudinal section of another embodiment of the invention;

FIG. 6 diagrammatically shows characteristics of the other embodiment of the invention;

FIG. 7 shows a longitudinal section of still other embodiment of the invention;

FIG. 8 diagrammatically shows characteristics of the still other embodiment of the invention; and FIG. 9 diagrammatically shows characteristics of the conventional device.

DETAILED DESCRIPTION OF THE EMBODIMENTS OF THE INVENTION

With reference to FIGS. 1, 5 and 7, a cooling fan control mechanism is described. A heat-responsive bimetal member 4 is connected at a front and a rear center surface $8_2$ and $8_1$ with an actuating rod 7 of a fluid clutch mechanism $a$ so that the bimetal member can be deformed and restored along the axis of the rod. The bimetal member is thus secured at the rear end rigidly with a valve member 13 disposed in a fluid accumulator chamber 12 thereby to operatively open and close an outlet 11 formed in a partition plate 10 in response to variation of environmental temperatures of an engine, and is engaged at a peripheral edge 5 in an annular groove 3 of an attachment base protruding on the front surface of a casing closure 1 of a fluid coupling.

The attachment base 2 is provided with more than one aeration openings. The partition plate 10 interposed between the casing closure 1 and a casing 16 has an inlet 15 formed therein in a peripheral position. The inlet 15 in combination with a finger-like protrusion 17 rigid with the casing closure constitute means 1 for allow a fluid amount in a peripheral end of a torque transmission chamber 18 under centrifugation to flow into the fluid accummulator chamber 12.

A drive shaft 21 is supported through bearing 20 on the casing 16 and has at an inner end a drive disc 19 spaced from an inner surfaces of the partition plate 10 and the casing 16 to define a torque transmission spacing $22_1$, $22_2$. The drive shaft 21 is provided at an outer end with a flange 23 having a suited number of apertures 24, 24, fomed therein to receive bolt stems for engaging a pulley (not shown) thereto.

The drive disc 19 has a stepped peripheral groove 25 formed in the periphery and passages 26, 26, extending across the torque transmission spacings $22_2$.

The casing 16 is provided at the rear portion with coller fan vanes 27, 27, secured with bolt apertures 28, 28,.

Coil springs, engaging surfaces of the bimetal member may be provided. In FIG. 1, coil spring $9_1$ engages rear surface 8, of the bimetal member. In FIG. 5 coil spring $9_2$ engages the front surface $8_2$ of the bimetal member. In FIG. 7, coil springs $9_1$ and $9_2$ engage rear surface 8, and front surface $8_2$ of the bimetal member, respectively. In the latter case one of coil springs is compressed, while another coil spring is not compressed, to exert an urging force on either of the rear or the front surface of the bimetal member, or, stated another way, only one of the rear and the front surface of the bimetal member is applied with an urging force.

Reference number 29 in FIG. 5 designates a pivot joint of the valve member 13.

FIGS. 2, 6, 8 and 9 shows a diagram of fan rotation speed, FR, graphed as a function of the environmental temperature, T, of the engine. $l_1$ is a curve representing characteristics of one embodiment of this invention. $l_2$ is a curve representing in the same manner characteristics of a conventional mechanism comprised of a bimetal member. T and T', show the temperature range fro activation and deactivation of a fluid clutch having conventional control mechanisms and one having the control mechanism of an embodiment of the present invention, respectively.

The heat-responsive bimetal member 4 is distorted, as an environmental temperature of an engine rises, to cause the valve member 13 to open the outlet 11 through which a fluid accumulated in the fluid accumulator chamber 12 by interminal inflow through the dammed inlet 15 is allowed to flow into the torque transmission spacings $22_1$, $22_2$ in the torque transmission chamber thereby to increase a relative rotational velocity of cooler fan blades 28 with that of the drive shaft. An inward distortion of the bimetal member 4 permits the valve member to close the outlet 11, at a low environmental temperature of an engine, thereby to reduce flow rate of the fluid into the torque transmission spacings $22_1$, $22_2$, resulting in reduction of a relative velocity of the cooler fan blades.

The bimetal member 4 is distorted at a desired, predetermined temperature in an inward or an outward direction which is instantaneously determined by its cup-like configuration, to actuate valve member 13 to open or close the outlet 11.

Some amplitude of difference is observed to exist between the temperatures of inverse deformation and restoration of the bimetal 14, when it is solely fitted on the actuating rod 7. A warmed water test showed that the temperature difference was approximately 13° C as to a bimetal of diameter of 28 mm and thickness of 0.2 mm. It is apparent that a bimetal of this dimension when directed to control of a fluid coupling for cooler fan will often present a temperature difference in the order of 20° C to 30° C due to a low heat conductivity of an environmental air and a thermal influence of the coupling case.

In this invention, the cup-like bimetal member is coupled with coil spring $9_1$ and $9_2$ or springs $9_1$ and $9_2$ as shown in FIGS. 1, 5, and 7, respectively, to add an urging force to that of the curved bimetal, so that operative temperatures responsive to which the bimetal member is deformed and restored can be approximated to a determined degree for control of the fluid coupling by selective adjustment of an initial compression of the spring or springs. The operative temperatures of the inverse deformation and restoration of the bimetal member can be thus adjusted to any degree suited to the purpose of applications, and design of the control is facilitated to obtain any desired characteristics. The bimetal control can thus perform an instantaneous responsive operation to variation of an environmental temperature of an engine in a more efficient manner.

What is claimed is:

1. A control mechanism for a fluid clutch coupling a cooler fan with an engine including a mounting base; a cup-shaped, snap-deformable heat-responsive bimetal member with a central apex portion and a concave-convex section, which member is mounted by engagement of its peripheral edge in a annular groove formed in the mounting base; an actuating rod extending from the apex portion of the bimetal member adapted to actuate the fluid clutch and a coil spring disposed to apply an urging force on a central apex portion of the surface of said heat-responsive bimetal member to minimize the difference between a temperature at which the bimetal member snap deforms to couple the engine and fan, and a temperature at which the bimetal member snap deforms to decouple the engine and fan.

2. The control mechanism of claim 1 wherein the spring engages the concave principal surface of the bimetal member.

3. The control mechanism of claim 1 wherein the spring engages the convex principal surface of the bimetal member.

4. The control mechanism of claim 3 further comprising a second spring engaging the concave principal surface of the bimetal member so that the first and second springs exert a force on the convex and concave principal surfaces of the bimetal member, respectively.

5. In a fluid drive coupling between an engine and a cooler fan therefor, activated and deactivated responsive to deformation of a bimetal member, the improvement comprising spring means for biasing the bimetal member to reduce the difference between the temperature at which the coupling is activated and the temperature at which the coupling is deactivated, wherein said spring means comprises:
    a first coil spring engaging one surface of the bimetal member to bias the bimetal member to induce activation of the coupling; and
    a second coil spring engaging another surface of the bimetal member to bias the bimetal member to induce deactivation of the coupling.

6. In a fluid transmission for coupling and decoupling a vehicle engine with a fan for cooling the engine, wherein said fluid transmission couples and decouples the vehicle engine with the fan responsive to snap deformation of a cup-shaped bimetallic member, the deformation being caused by changes in the environmental temperature of the engine, the improvement coupling spring means for biasing the bimetallic member to minimize the difference between a temperature at which the bimetallic member snap deforms to couple the engine and the fan, and a temperature at which the bimetallic member snap deforms to decouple the engine and the fan, said spring means including:
    a first coil spring engaging the concave principal surface of the cup-shaped bimetallic member; and
    a second coil spring engaging the convex principal surface of the cup-shaped bimetallic member, said first and second coil springs exerting opposing forces on the bimetallic member.

* * * * *